United States Patent
Yanase et al.

(10) Patent No.: US 11,415,988 B2
(45) Date of Patent: *Aug. 16, 2022

(54) CONTROL APPARATUS OF HYBRID LEANING VEHICLE

(71) Applicant: KAWASAKI MOTORS, LTD., Akashi (JP)

(72) Inventors: Daisuke Yanase, Akashi (JP); Daisuke Kawai, Kobe (JP); Tatsuya Hirokami, Kobe (JP); Shohei Terai, Kobe (JP); Kosuke Obayashi, Nishinomiya (JP); Kyotaro Nakayama, Kakogawa (JP)

(73) Assignee: KAWASAKI MOTORS, LTD., Akashi (JP)

(*) Notice: Subject to any disclaimer, the term of this patent is extended or adjusted under 35 U.S.C. 154(b) by 257 days.

This patent is subject to a terminal disclaimer.

(21) Appl. No.: 16/714,082

(22) Filed: Dec. 13, 2019

(65) Prior Publication Data

US 2020/0192369 A1 Jun. 18, 2020

(30) Foreign Application Priority Data

Dec. 18, 2018 (JP) .............................. JP2018-236165

(51) Int. Cl.
*G05D 1/00* (2006.01)
*B62D 6/00* (2006.01)
*B62D 6/04* (2006.01)

(52) U.S. Cl.
CPC ........... *G05D 1/0088* (2013.01); *B62D 6/008* (2013.01); *B62D 6/04* (2013.01)

(58) Field of Classification Search
CPC ........ G05D 1/0088; B62D 6/008; B62D 6/04; B60W 30/182
See application file for complete search history.

(56) References Cited

U.S. PATENT DOCUMENTS 9,150,218 B2 10/2015 Makabe et al.
2004/0162663 A1* 8/2004 Kogure .............. B60G 17/0195
701/72

(Continued)

FOREIGN PATENT DOCUMENTS

DE 102014215259 A1 2/2016
EP 1627810 A2 2/2006

(Continued)

*Primary Examiner* — Jeff A Burke
*Assistant Examiner* — Blake A Wood
(74) *Attorney, Agent, or Firm* — Alleman Hall Creasman & Tuttle LLP

(57) ABSTRACT

A control apparatus of a hybrid leaning vehicle includes: a travel mode request section that requests one travel mode selected from a plurality of travel modes including a first travel mode in which an engine is stopped and an electric motor is operated and a second travel mode in which the engine is operated; and a travel mode setting section. When the travel mode request section requests the second travel mode during travel in the first travel mode, the travel mode setting section, upon determining that a steady turning condition is satisfied, sets the second travel mode as the travel mode to be executed and, upon determining that the steady turning condition is not satisfied, prohibits the second travel mode from being set as the travel mode to be executed.

11 Claims, 4 Drawing Sheets

(56) References Cited

U.S. PATENT DOCUMENTS

| | | | | |
|---|---|---|---|---|
| 2008/0249683 A1* | 10/2008 | Wu | ............... | B62D 15/0215 |
| | | | | 701/41 |
| 2009/0024350 A1* | 1/2009 | Suzuki | ............... | G01C 9/00 |
| | | | | 702/141 |
| 2013/0282215 A1* | 10/2013 | Makabe | ............... | B60K 6/48 |
| | | | | 180/65.265 |
| 2014/0058609 A1* | 2/2014 | Matsuda | ............ | B60L 50/66 |
| | | | | 701/22 |
| 2014/0297079 A1* | 10/2014 | Saitoh | ............ | B60W 20/00 |
| | | | | 903/930 |
| 2015/0081170 A1* | 3/2015 | Kikuchi | ............ | B60G 17/06 |
| | | | | 701/37 |
| 2015/0149016 A1* | 5/2015 | Saitoh | ............ | B60W 10/08 |
| | | | | 180/65.265 |

FOREIGN PATENT DOCUMENTS

| | | | |
|---|---|---|---|
| EP | 2708457 A1 | 3/2014 | |
| EP | 3335955 A1 * | 6/2018 | ............ B60T 8/1706 |
| JP | 5903311 B2 | 4/2016 | |
| JP | 2016185746 A | 10/2016 | |
| WO | WO-2014206655 A1 * | 12/2014 | ...... B60W 30/18154 |
| WO | 2018173670 A1 | 9/2018 | |
| WO | 2018173671 A1 | 9/2018 | |

\* cited by examiner

CONTROL APPARATUS OF HYBRID LEANING VEHICLE

CROSS-REFERENCE TO RELATED APPLICATION

This application claims priority to and the benefit of Japanese Patent Application No. 2018-236165, filed on Dec. 18, 2018, the entire disclosure of which is incorporated herein by reference.

BACKGROUND OF THE INVENTION

Field of the Invention

The present disclosure relates to a control apparatus of a hybrid leaning vehicle including an engine configured as an internal combustion engine and an electric motor serving as a drive source for travel of the hybrid leaning vehicle, the hybrid leaning vehicle being configured to turn with its vehicle body inclined laterally.

Description of the Related Art

A hybrid vehicle including an engine and an electric motor is known (see Japanese Patent No. 5903311, for example). Such a hybrid vehicle is switchable between different travel modes depending on parameters such as the remaining battery capacity, and the travel modes include a travel mode in which the electric motor is operated with the engine stopped and a travel mode in which both the engine and the electric motor are operated.

The use of the hybrid system in leaning vehicles such as motorcycles may suffer from a problem peculiar to leaning vehicles. When a rider of a leaning vehicle turns a corner, the rider inclines the vehicle body laterally at the beginning of cornering (bank operation) and returns the vehicle body to the upright position at the end of cornering (position returning operation); that is, the rider performs a turning maneuver by changing the bank angle of the vehicle body. During the turning, the travel mode may switch from a mode in which the electric motor is operated with the engine stopped, and the engine may be automatically started up in response to the switching. Once the engine shifts from a stopped state to an operative state, gyro effect is produced by the rotation of the engine and acts to hinder the change of the position of the vehicle body. Thus, after the start-up of the engine, a moment of inertia acting as a resistance to the bank operation or the position returning operation occurs unlike before the start-up of the engine. For this reason, the force that the rider needs to apply to incline the vehicle body or place the vehicle body upright varies before and after the start-up of the engine, and the operation feeling is deteriorated.

SUMMARY OF THE INVENTION

An object of the present disclosure is to prevent a hybrid leaning vehicle from undergoing a change in moment of inertia when the rider performs bank operation or position returning operation on the vehicle body during turning and ensure good operation feeling of the hybrid leaning vehicle during turning.

A control apparatus according to an aspect of the present disclosure is a control apparatus of a hybrid leaning vehicle including an engine configured as an internal combustion engine and an electric motor serving as a drive source for travel of the hybrid leaning vehicle, the control apparatus including: a travel mode request section that requests one travel mode selected from a plurality of travel modes including a first travel mode in which the engine is stopped and the electric motor is operated and a second travel mode in which the engine is operated; and a travel mode setting section that determines whether a steady turning condition is satisfied and that, depending on a result of the determination, sets the travel mode requested by the travel mode request section as a travel mode to be executed, the steady turning condition including a first condition that the leaning vehicle is determined to be in a predetermined steady turning state or a second condition that the leaning vehicle is predicted to remain in the steady turning state for at least a predetermined time, wherein when the travel mode request section requests the second travel mode during travel in the first travel mode, the travel mode setting section, upon determining that the steady turning condition is satisfied, sets the second travel mode as the travel mode to be executed, and when the travel mode request section requests the second travel mode during travel in the first travel mode, the travel mode setting section, upon determining that the steady turning condition is not satisfied, prohibits the second travel mode from being set as the travel mode to be executed.

With the above configuration, if the leaning vehicle traveling in an engine-stopped state is determined not to be in the steady turning state or is predicted to enter an unsteady turning state within the predetermined time, the transition to a travel mode in which the engine is started up is prohibited even when such a travel mode is requested. This prevents gyro effect from being produced by rotation of the engine and causing a change in the moment of inertia acting when the rider performs the bank operation or the position returning operation on the vehicle body, thereby ensuring good operation feeling of the hybrid leaning vehicle during turning.

The "steady turning state" refers to a state in which a physical quantity affecting the vehicle body is steady when the rider is making a turn by banking the vehicle body, and the "unsteady turning state" refers to a state in which the physical quantity affecting the vehicle body is unsteady when the rider is making a turn by banking the vehicle body. The first travel mode may be, for example, an EV mode. The second travel mode may be, for example, a transient mode occurring in the course of transition from the EV mode to an HEV or EGV mode. When the transient mode is not provided, the second travel mode may be the HEV or EGV mode.

In an example, the steady turning state may include a state in which an angular velocity of a vehicle body of the leaning vehicle about a front-rear axis of the vehicle body has an absolute value less than a predetermined threshold, and upon determining that the angular velocity has an absolute value less than the predetermined threshold, the travel mode setting section may determine that the first condition is satisfied.

With this configuration, it can be determined that the rider keeps the vehicle body in a substantially fixed position in the bank direction if the angular velocity about the front-rear axis has an absolute value less than the predetermined threshold. Further, it can be appropriately determined that the rider is performing the bank operation or position returning operation on the vehicle body of the leaning vehicle if the angular velocity about the front-rear axis has an absolute value equal to or greater than the predetermined threshold.

In an example, the steady turning state may include a state in which a steering angular velocity of the leaning vehicle has an absolute value less than a predetermined threshold, and upon determining that the steering angular velocity has an absolute value less than the predetermined threshold, the travel mode setting section may determine that the first condition is satisfied.

With this configuration, it can be determined that the rider keeps the vehicle body in a substantially fixed position in the bank direction if the steering angular velocity has an absolute value less than the predetermined threshold. Further, it can be appropriately determined that the rider is performing the bank operation or position returning operation on the vehicle body of the leaning vehicle if the steering angular velocity has an absolute value equal to or greater than the predetermined threshold.

In an example, the travel mode setting section may determine that the second condition is satisfied if the leaning vehicle is predicted, based on at least one of blinker operation information, vehicle location information, and forward camera information, to remain in the steady turning state for at least the predetermined time.

With this configuration, it can be appropriately determined whether the leaning vehicle is in a state in which the rider is predicted not to perform the bank operation or position returning operation on the vehicle body of the leaning vehicle.

In an example, the hybrid leaning vehicle may be a parallel hybrid leaning vehicle including the engine as a drive source for travel of the parallel hybrid leaning vehicle and a clutch disposed in a power transmission route between the engine and a drive wheel, the second travel mode may be a mode in which the engine is operated with the clutch disengaged, the plurality of travel modes may further include a third travel mode in which the engine is operated with the clutch engaged, and the travel mode setting section may determine whether a predetermined shock accepting condition is satisfied. When the travel mode request section requests the third travel mode during travel in the second travel mode, the travel mode setting section may, upon determining that the shock accepting condition is satisfied, set the third travel mode as the travel mode to be executed, and when the travel mode request section requests the third travel mode during travel in the second travel mode, the travel mode setting section may, upon determining that the shock accepting condition is not satisfied, prohibit the third travel mode from being set as the travel mode to be executed.

With this configuration, when a travel mode in which the clutch is engaged is requested while the engine is in operation with the clutch disengaged, the transition to the requested travel mode is prohibited unless the shock accepting condition is satisfied. This prevents the clutch from becoming engaged while the engine is in operation, thereby preventing abrupt torque variation. Consequently, the spontaneous occurrence of torque variation can be prevented in a travel state where any shock is undesired, and good operation feeling of the hybrid leaning vehicle can be ensured. The third travel mode may be, for example, an HEV mode or an EGV mode.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, an embodiment will be described with reference to the drawings.

Figure 1:
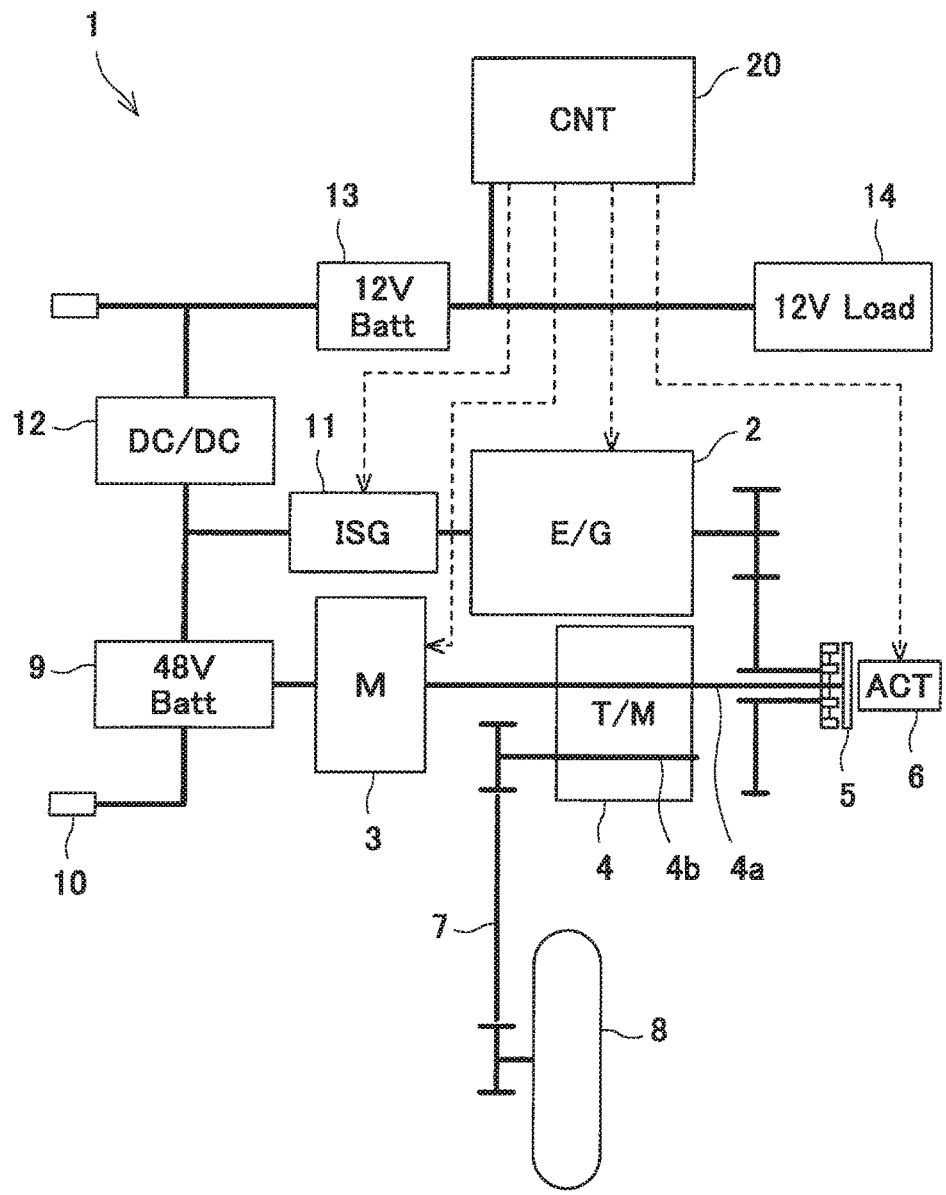
FIG. 1 is a block diagram of a hybrid motorcycle according to an embodiment.

FIG. 1 is a block diagram of a hybrid motorcycle 1 according to an embodiment. The motorcycle 1 is a preferred example of a leaning vehicle that turns with its vehicle body inclined (leaned) in a leftward/rightward direction. The leaning vehicle may be a three-wheeled vehicle. As shown in FIG. 1, the hybrid motorcycle 1 includes an engine 2, an electric motor 3, a transmission 4, a clutch 5, a clutch actuator 6, an output transmission member 7, a drive wheel 8, a high-voltage battery 9, a charging port 10, an ISG 11, a converter 12, a low-voltage battery 13, and a control apparatus 20.

The engine 2 is an internal combustion engine. The engine 2 is a drive source for driving the drive wheel 8. The electric motor 3 is a drive source for driving the drive wheel 8 together with or instead of the engine 2. The transmission 4 changes the speed of rotational power output from the engine 2. The transmission 4 is, for example, a manual transmission including an input shaft 4a, an output shaft 4b, and speed-change gears.

The clutch 5 is engaged and disengaged to enable and disable power transmission between the engine 2 and the transmission 4. The clutch actuator 6 actuates the clutch 5 to cause the clutch 5 to switch between the engaged state and the disengaged state. The output transmission member 7 is a member that receives rotational power output from the output shaft 4b of the transmission 4 and that transmits the rotational power to the drive wheel 8. The output transmission member 7 is, for example, a drive chain, a drive belt, or a drive shaft. The drive wheel 8 is, for example, the rear wheel of the hybrid motorcycle 1.

The high-voltage battery 9 stores electricity of high voltage (e.g., 48 V) to be supplied to the electric motor 3. The charging port 10 is connected to the high-voltage battery 9. The ISG 11 is an integrated starter generator. The ISG 11 can bring the engine 2 into operation at the start-up of the engine 2 and can be driven by the engine 2 to generate electricity. The converter 12 reduces the voltage of DC power delivered from the high-voltage battery 9 and the ISG 11 and supplies the resulting DC power to the low-voltage battery 13. The low-voltage battery 13 stores electricity of low voltage (e.g., 12 V) to be supplied to the control apparatus 20 and another low-voltage load 14 which are mounted in the hybrid motorcycle 1.

The control apparatus 20 controls the engine 2, electric motor 3, clutch actuator 6, and ISG 11 based on information obtained through various sensors. The control apparatus 20 may be configured as a single controller or may be constituted by a plurality of separate controllers. Hardware components of the control apparatus 20 include a processor, a volatile memory, a non-volatile memory, and an I/O interface. The details of the function of the control apparatus 20 will be described later.

Figure 2:
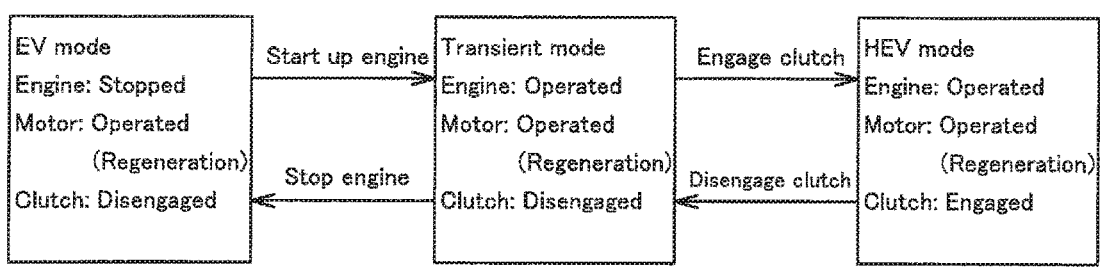
FIG. 2 is a state transition diagram illustrating transition of the hybrid motorcycle of FIG. 1 between different travel modes.

FIG. 2 is a state transition diagram illustrating transition of the hybrid motorcycle 1 of FIG. 1 between different travel modes. As shown in FIG. 2, the hybrid motorcycle 1 is operable in a plurality of travel modes differing from one another in the state of at least one of the engine 2, the electric motor 3, and the clutch 5. Specifically, the travel modes include an EV mode, an HEV mode, and a transient mode.

The EV mode is a mode in which the engine 2 is stopped and the drive wheel 8 is driven with power generated by the electric motor 3. In the EV mode, the clutch 5 is brought into a disengaged state to prevent the engine 2 from acting as a resistance when the electric motor 3 is in operation. In the EV mode, the electric motor 3 is brought into a driving state during acceleration, while during deceleration, the electric motor 3 is brought into a regeneration state.

The HEV mode is a mode in which the drive wheel 8 is driven with power generated by the electric motor 3 and the engine 2. In the HEV mode, the clutch 5 is brought into an engaged state to allow the rotational power of the engine 2 to be transmitted to the drive wheel 8 via the transmission 4. In the HEV mode, the electric motor 3 is brought into a driving state during acceleration, while during deceleration, the electric motor 3 is brought into a regeneration state.

The transient mode is a mode that occurs in the course of transition from the EV mode to the HEV mode. In the transient mode, the engine 2 is started up while the clutch 5 is kept in the disengaged state. Specifically, in transition from the EV mode travel to the HEV mode travel, the transient mode first occurs so that the engine 2 is started up with the clutch 5 kept in the disengaged state, and then the clutch 5 is engaged to accomplish the transition to the HEV mode.

The travel modes of the hybrid motorcycle 1 may include an EGV mode (engine vehicle mode) in which the engine 2 is operated with the electric motor 3 not in operation so as to drive the drive wheel 8 only with the rotational power of the engine 2, although the EGV mode is not shown in FIG. 2.

Figure 3:
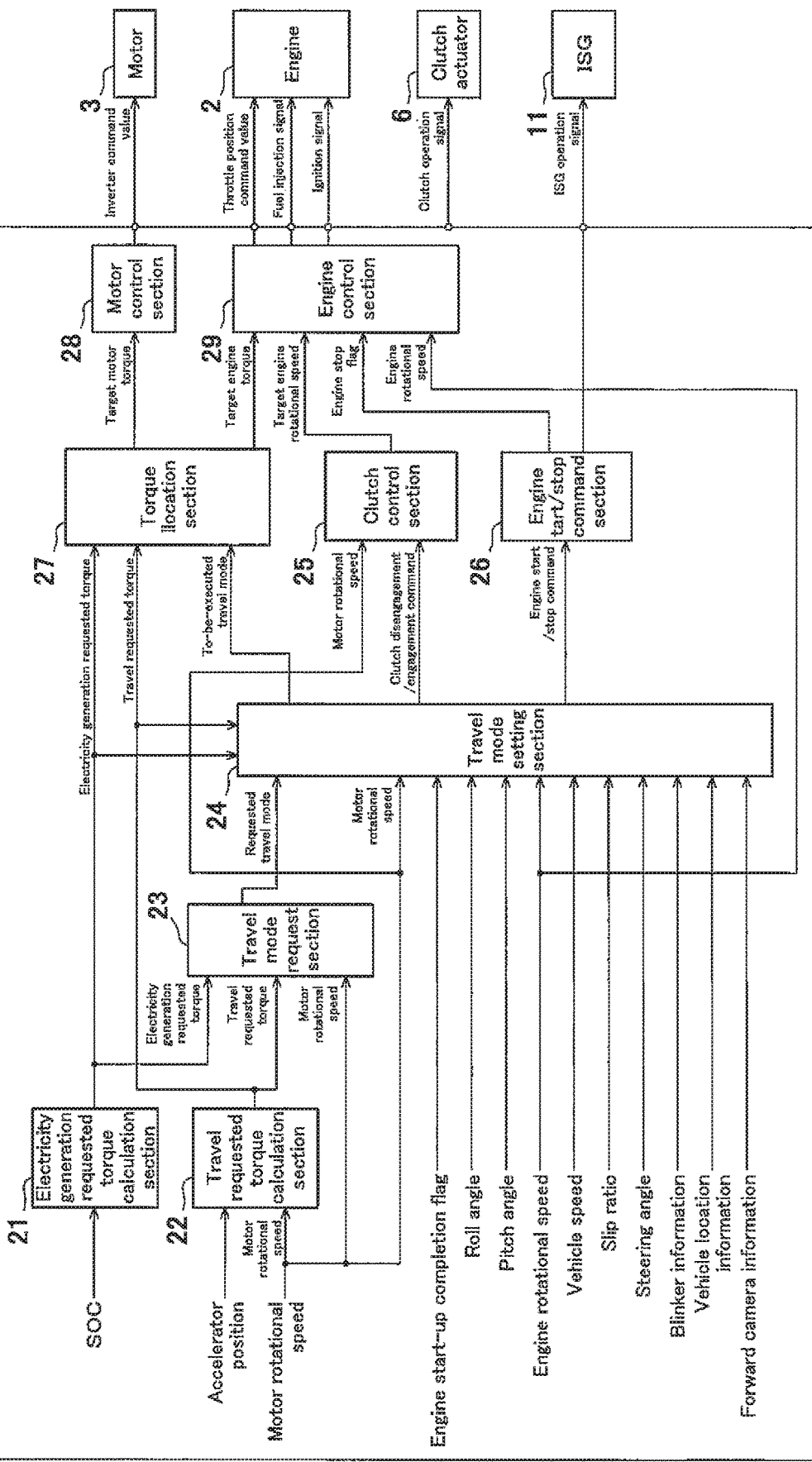
FIG. 3 is a block diagram of a control apparatus of the hybrid motorcycle of FIG. 1.

FIG. 3 is a block diagram of the control apparatus 20 of the hybrid motorcycle 1 of FIG. 1. As shown in FIG. 3, the control apparatus 20 includes an electricity generation requested torque calculation section 21, a travel requested torque calculation section 22, a travel mode request section 23, a travel mode setting section 24, a clutch control section 25, an engine start/stop command section 26, a torque allocation section 27, a motor control section 28, and an engine control section 29. The sections 21 to 29 of the control apparatus 20 are implemented through processing operations performed by the processor using the volatile memory according to a program stored in the non-volatile memory.

The electricity generation requested torque calculation section 21 monitors a state of charge (SOC) representing the charging state of the high-voltage battery 9 and calculates an electricity generation requested torque for electricity generation of the electric motor 3 according to the SOC (%). That is, upon decrease in the remaining capacity of the high-voltage battery 9, the electricity generation requested torque calculation section 21 calculates an electricity generation torque needed for the electric motor 3 to charge the high-voltage battery 9. The SOC can be calculated from an output of a remaining battery capacity sensor.

The travel requested torque calculation section 22 calculates a travel requested torque representing a torque needed to drive the drive wheel 8, and makes the calculation according to the accelerator position and motor rotational speed. The accelerator position represents the amount of accelerator operation performed by the rider, and can be acquired from an output of an accelerator position sensor. The motor rotational speed is calculated, for example, from a value detected by a rotational speed sensor provided on a rotation shaft of the electric motor 3 and may alternatively be calculated from a control signal for the electric motor 3.

The travel mode request section 23 selects a desired travel mode from the plurality of travel modes (such as the EV, transient, and HEV modes) according to the electricity generation requested torque, the travel requested torque, and the motor rotational speed, and sets the selected mode as a requested travel mode. For example, the travel mode request section 23 may select the EV mode as the requested travel mode when the electricity generation requested torque is zero. For example, when the electricity generation requested torque is greater than zero and the travel requested torque is high with respect to the engine rotational speed, the travel mode request section 23 may select the HEV mode as the requested travel mode.

The travel mode setting section 24 determines, based on various sensor information, whether the requested travel mode may be set as the travel mode to be executed. Examples of the information input to the travel mode setting section 24 include an engine start-up completion flag, the roll angle, the pitch angle, the motor rotational speed, the vehicle speed, the slip ratio, the steering angle, blinker information, vehicle location information, and forward camera information. The engine start-up completion flag is input to the travel mode setting section 24 if the engine rotational speed remains equal to or higher than an idling speed for at least a predetermined time. The roll angle and the pitch angle are calculated, for example, from values detected by a vehicle-mounted gyro sensor and may alternatively be calculated from values detected by a roll angle sensor and a pitch angle sensor. The pitch angle may be calculated from the stroke amounts of the front and rear suspensions. The motor rotational speed is calculated, for example, from a value detected by the rotational speed sensor provided on the rotation shaft of the electric motor 3 and may alternatively be calculated from a control signal for the electric motor 3. The engine rotational speed can be calculated from an output of a crank angle sensor that detects the crank angle of the crankshaft of the engine 2.

The vehicle speed is calculated, for example, from a value detected by a rotational speed sensor for the driven wheel (e.g., the front wheel) and may alternatively be calculated from GPS information or any other information. The slip ratio is calculated, for example, by the following equation: Slip ratio=(drive wheel rotational speed−driven wheel rotational speed)/driven wheel rotational speed. The slip ratio may alternatively be the rate of increase in the drive wheel rotational speed. The steering angle is calculated, for example, from a value detected by a steering angle sensor. The blinker information is acquired as left turn/right turn blinker operation information based on a signal output in response to operation of the blinker by the rider. The vehicle location information is acquired based on a value detected by a GPS sensor and on map information and indicates the location of the traveling hybrid motorcycle 1 on the map. The forward camera information is image information acquired through a vehicle-mounted camera that captures images of the environment ahead of the hybrid motorcycle 1.

Once the travel mode request section 23 makes a request for transition to the transient mode during the EV mode travel, the travel mode setting section 24 determines, based on the travel state, whether the transition to the transient mode may be permitted. More specifically, once transition from the EV mode to the transient mode is requested, the travel mode setting section 24 determines whether a predetermined steady turning condition is satisfied and, upon determining that the condition is satisfied, the travel mode setting section 24 permits the transition to the transient mode (decides to execute the transient mode).

The steady turning condition includes a first condition that the hybrid motorcycle 1 is determined to be in a predetermined steady turning state. For example, the first condition includes a condition that the steering angular velocity of the handle has an absolute value less than a predetermined threshold.

The steady turning condition includes a second condition that the hybrid motorcycle 1 is predicted to remain in the steady turning state for at least a predetermined time. For example, the second condition includes a condition that the hybrid motorcycle 1 is predicted, based on at least one of the blinker operation information, the vehicle location information, and the forward camera information, to remain in the steady turning state for at least the predetermined time.

Once the travel mode request section 23 makes a request for transition to the HEV mode during the transient mode travel, the travel mode setting section 24 determines, based on the travel state, whether the transition to the HEV mode may be permitted. More specifically, once transition from the transient mode to the HEV mode is requested, the travel mode setting section 24 determines whether a predetermined shock accepting condition is satisfied and, upon determining that the condition is satisfied, the travel mode setting section 24 permits the transition to the HEV mode (decides to execute the HEV mode).

The clutch control section 25 receives a clutch disengagement/engagement command (clutch disengagement command or clutch engagement command) from the travel mode setting section 24, and sends a clutch operation signal (disengagement signal or engagement signal) to the clutch actuator 6 according to the clutch disengagement/engagement command and the motor rotational speed to bring the clutch actuator 6 into operation, thereby causing the clutch 5 to be disengaged or engaged. The clutch control section 25 calculates a target engine rotational speed for smooth clutch engagement. The engine start/stop command section 26 sends an ISG operation signal to the ISG 11 in response to an engine start-up command from the travel mode setting section 24 and brings the ISG 11 into operation to start-up the engine 2. The engine start/stop command section 26 sends an engine stop flag to the engine control section 29 in response to an engine stop command from the travel mode setting section 24.

The torque allocation section 27 determines a target motor torque and a target engine torque according to the electricity generation requested torque calculated by the electricity generation requested torque calculation section 21, the travel requested torque calculated by the travel requested torque calculation section 22, and the to-be-executed travel mode set by the travel mode setting section 24.

The motor control section 28 sends an inverter command value to the electric motor 3 (in particular, an inverter of the electric motor 3) according to the target motor torque determined by the torque allocation section 27 and causes the electric motor 3 to operate so that the electric motor 3 produces an output torque equal to the target motor torque.

The engine control section 29 sends an engine control signal according to the target engine torque determined by the torque allocation section 27 or the target engine rotational speed determined by the clutch control section 25 and controls the engine 2 so that the engine 2 produces an output torque equal to the target engine torque. Specifically, the engine control section 29 controls the engine 2 by sending a throttle position command value to a throttle device of the engine 2, a fuel injection signal to a fuel injection device of the engine 2, and an ignition signal to an ignition device of the engine 2.

Figure 4:
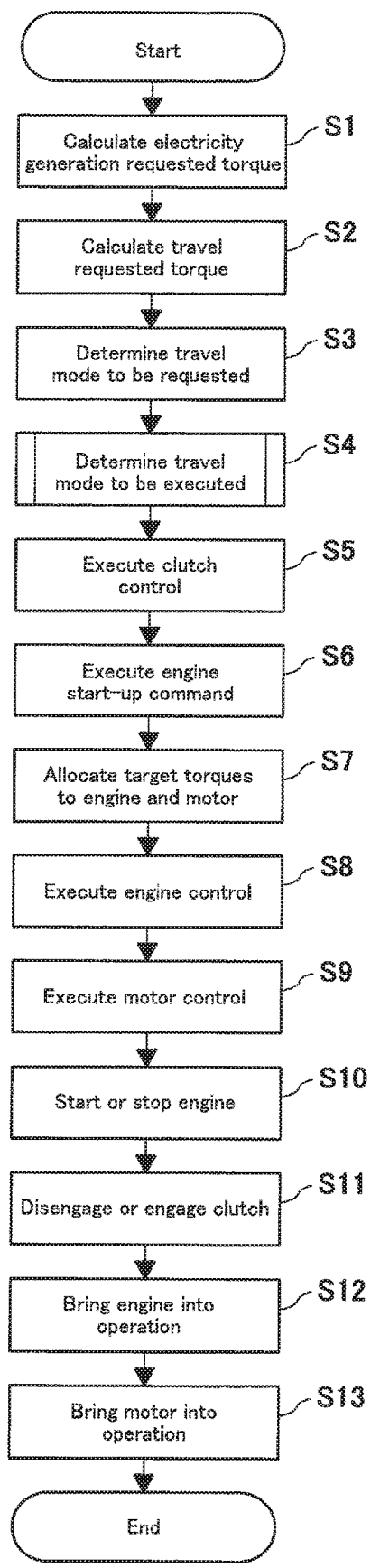
FIG. 4 is a flowchart illustrating a main routine performed by the control apparatus of FIG. 3.

Hereinafter, the flow of the travel mode transition process performed by the control apparatus 20 will be described. FIG. 4 is a flowchart illustrating the main routine performed by the control apparatus 20 shown in FIG. 3. As shown in FIG. 4, the electricity generation requested torque calculation section 21 calculates the electricity generation requested torque (step S1). The travel requested torque calculation section 22 calculates the travel requested torque (step S2). The order in which steps S1 and S2 are performed is not particularly limited. It is preferable that steps S1 and S2 be concurrently performed. Next, the travel mode request section 23 determines the requested travel mode according to the electricity generation requested torque, the travel requested torque, and the motor rotational speed (step S3).

The travel mode setting section 24 determines whether the requested travel mode may be set as the travel mode to be executed (step S4). The details of the process performed by the travel mode setting section 24 will be described later with reference to FIG. 5. After step S4, control is performed according to the to-be-executed travel mode set by the travel mode setting section 24; that is, the clutch control section 25 controls the clutch actuator 6 (step S5), the engine start/stop command section 26 controls the ISG 11 (step S6), the torque allocation section 27 determines the target motor torque and the target engine torque (step S7), and the engine control section 29 and the motor control section 28 control the engine 2 and the electric motor 3, respectively (steps S8 and S9). Specifically, along with the travel mode transition, the engine 2 is started or stopped (step S10), the clutch 5 is disengaged or engaged (step S11), the engine 2 is brought into operation (step S12), and the electric motor 3 is brought into operation (step S13). For convenience of illustration, steps S5 to S13 are shown in a serial order. However, the order in which steps S5 to S13 are performed is not particularly limited, and these steps may be performed in any order suitable for the situation and needs.

Figure 5:
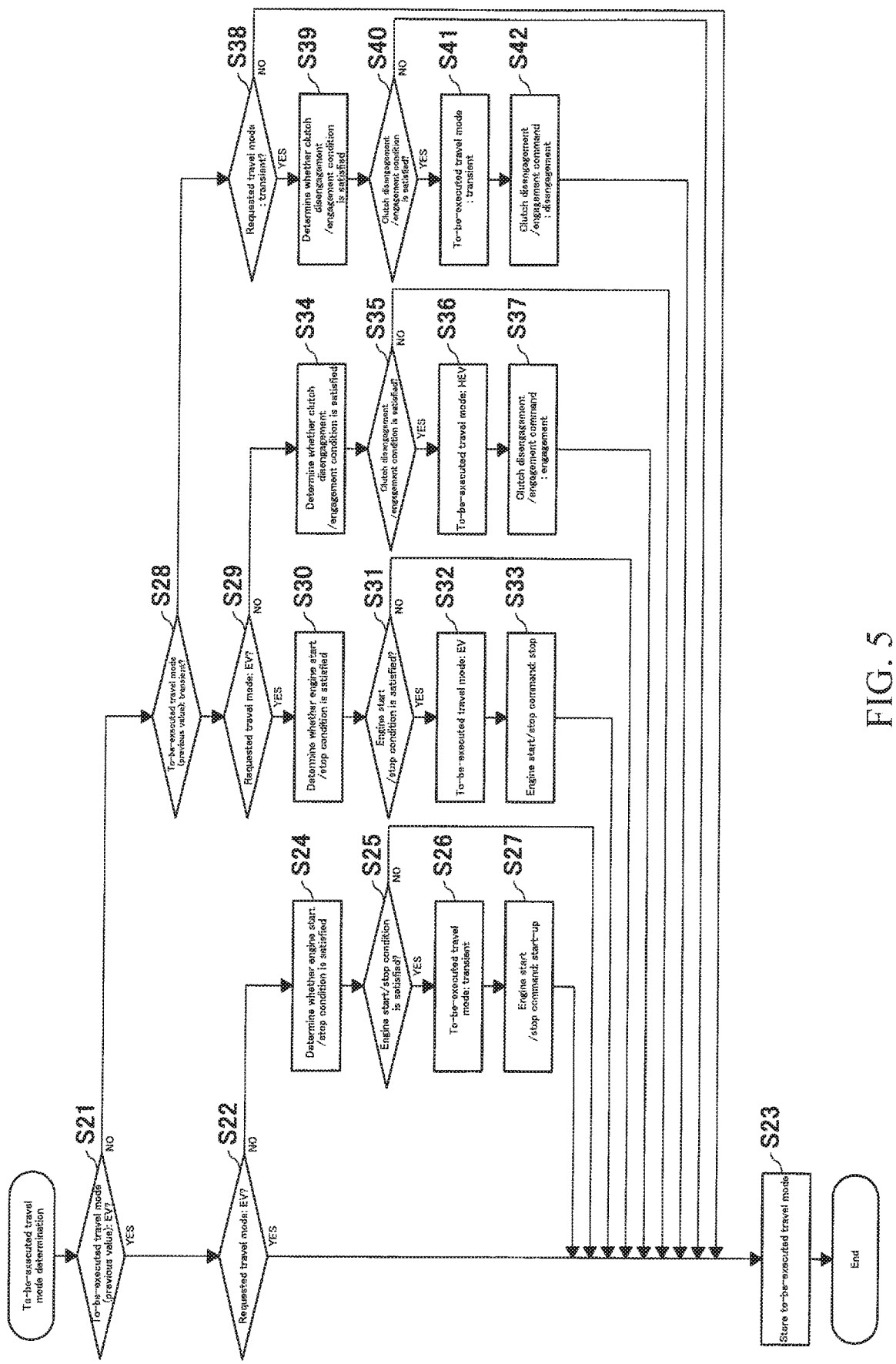
FIG. 5 is a flowchart illustrating a subroutine of to-be-executed travel mode determination shown in FIG. 4.

FIG. 5 is a flowchart illustrating a subroutine of the to-be-executed travel mode determination shown in FIG. 4. The process of the to-be-executed travel mode determination (step S4 of FIG. 4) is executed by the travel mode setting section 24. As shown in FIG. 5, first, it is determined whether the current to-be-executed travel mode (previous value) is the EV mode (step S21). In the case of YES in step S21, it is determined whether the requested travel mode selected by the travel mode request section 23 is the EV mode (step S22). In the case of YES in step S22, the travel mode switching is not needed, and the EV mode remains stored as the to-be-executed travel mode (step S23).

In the case of NO in step S22, start-up of the engine 2 is requested, and it is determined whether start-up of the engine may be permitted, i.e., whether an engine start/stop condition is satisfied (steps S24 and S25). In the present embodiment, the engine start/stop condition is the steady turning condition described above. The engine start/stop condition includes a condition that the angular velocity of the vehicle body of the hybrid motorcycle 1 about the front-rear axis of the vehicle body (e.g., the roll rate) has an absolute value less than a predetermined threshold. When the engine start/stop condition (steady turning condition) is satisfied, it can be determined that the hybrid motorcycle 1 is in a steady turning state in which the rider is not performing the bank operation or position returning operation on the vehicle body of the hybrid motorcycle 1.

The engine start/stop condition may include a condition that the steering angular velocity of the hybrid motorcycle 1 has an absolute value less than a predetermined threshold. If the absolute value of the steering angular velocity is determined to be less than the predetermined threshold, it is determined that the engine start/stop condition (steady turning condition) is satisfied. This also enables determination of whether the hybrid motorcycle 1 is in a steady turning state in which the rider is not performing the bank operation or position returning operation on the vehicle body of the hybrid motorcycle 1. The engine start/stop condition (steady turning condition) may include a condition that the rate of change of turning radius (the rate of change of curvature) or the rate of change of lateral tire force is less than a predetermined threshold.

The engine start/stop condition (steady turning condition) may include a condition that the blinker has not been operated to indicate left turn or right turn. The engine start/stop condition (steady turning condition) may include a condition that it is determined based on the vehicle location information that the hybrid motorcycle 1 will not enter a curve within a predetermined time. The engine start/stop condition (steady turning condition) may include a condition that it is determined based on the forward camera information that the hybrid motorcycle 1 will not enter a curve within a predetermined time. In these cases, it is possible to determine whether the hybrid motorcycle 1 is in a state in which the rider is predicted not to perform the bank operation or position returning operation on the vehicle body of the hybrid motorcycle 1 within a predetermined time.

If it is determined that the steady turning condition and therefore the engine start/stop condition are satisfied (step S25: YES), the transient mode is set as the to-be-executed travel mode (step S26). The engine start/stop command section 26 then causes the ISG 11 to start up the engine 2 (step S27). The transient mode is stored as the current to-be-executed travel mode (step S23). If it is determined that the engine start/stop condition is not satisfied (step S25: NO), the transient mode is prohibited from being set as the to-be-executed travel mode, and the EV mode remains as the to-be-executed travel mode.

As described above, if the hybrid motorcycle 1 traveling in an engine-stopped state is not determined to be in the steady turning state or is not predicted to remain in the steady turning state for at least a predetermined time, the transition to the transient mode in which the engine 2 is started up is prohibited even when the transient mode is requested. This prevents gyro effect from being produced by rotation of the engine 2 and causing a change in the moment of inertia acting when the rider performs the bank operation or position returning operation, thereby ensuring good operation feeling of the hybrid motorcycle 1 during turning.

In the case of NO in step S21, it is determined whether the current to-be-executed travel mode (previous value) is the transient mode (step S28). In the case of YES in step S28, it is determined whether the requested travel mode is the EV mode (step S29). In the case of YES in step S29, i.e., in the case where a request is made for transition from the transient mode to the EV mode, stop of the engine 2 is requested. In this case, it is determined whether stop of the engine 2 may be permitted, i.e., whether the engine start/stop condition is satisfied (steps S30 and S31). Steps S30 and S31 are the same as steps S24 and S25. That is, in the present embodiment, the same condition is used both as the engine start condition for starting up the engine 2 and as the engine stop condition for stopping the engine 2. The engine start condition and the engine stop condition may be different.

If it is determined that the engine start/stop condition is satisfied (step S31: YES), the EV mode is set as the to-be-executed travel mode (step S32). The engine start/stop command section 26 then sends an engine stop flag to the engine control section 29, which stops the engine 2 (step S33). The EV mode is stored as the current to-be-executed travel mode (step S23). If it is determined that the engine start/stop condition is not satisfied (step S31: NO), the EV mode is prohibited from being set as the to-be-executed travel mode, and the transient mode remains as the to-be-executed travel mode.

As described above, if the hybrid motorcycle 1 traveling in an engine-operating state is not determined to be in the steady turning state or is not predicted to remain in the steady turning state for at least a predetermined time, the transition to the EV mode in which the engine 2 is stopped is prohibited even when the EV mode is requested. This prevents loss of the gyro effect due to stop of the engine 2 and thus prevents a change in the moment of inertia acting when the rider performs the bank operation or position returning operation during turning, thereby ensuring good operation feeling of the hybrid motorcycle 1 during turning.

In the case of NO in step S29, i.e., in the case where the requested travel mode is the HEV mode, it is determined whether a clutch disengagement/engagement condition is satisfied (steps S34 and S35). That is, it is determined whether the clutch 5 may be engaged for transition to the HEV mode after the engine 2 begins to rotate upon transition from the EV mode to the transient mode. In the present embodiment, the clutch disengagement/engagement condition is the shock accepting condition previously described.

If it is determined that the clutch disengagement/engagement condition (shock accepting condition) is satisfied (step S35: YES), the HEV mode is set as the to-be-executed travel mode (step S36). The clutch control section 25 then sends a clutch operation signal to the clutch actuator 6, which causes the clutch 5 to be engaged (step S37). The HEV mode is stored as the current to-be-executed travel mode (step S23). If it is determined that the clutch disengagement/engagement condition (shock accepting condition) is not satisfied (step S35: NO), the HEV mode is prohibited from being set as the to-be-executed mode, and the transient mode remains as the to-be-executed travel mode.

As described above, during travel in the transient mode in which the engine 2 is operated with the clutch 5 disengaged, the transition to the HEV mode in which the clutch 5 is engaged is prohibited unless the clutch disengagement/engagement condition (shock accepting condition) is satisfied, even when the HEV mode is requested. This prevents the clutch 5 from becoming engaged while the engine 2 is in operation, thereby preventing abrupt torque variation. Consequently, the spontaneous occurrence of torque variation can be prevented in a travel state where any shock is undesired, and good operation feeling of the hybrid motorcycle 1 can be ensured. Possible examples of the clutch disengagement/engagement condition (shock accepting condition) include various conditions, which will now be described.

The clutch disengagement/engagement condition (shock accepting condition) includes a condition that the roll angle of the vehicle body, as determined with respect to the upright position of the vehicle body, has an absolute value less than a predetermined threshold. If this condition is not satisfied, mode transition involving engagement of the clutch 5 is prohibited. Thus, when the vehicle body is inclined in the roll direction, the occurrence of torque variation due to engagement of the clutch 5 is prevented, and good operation feeling is ensured. The clutch disengagement/engagement condition (shock accepting condition) may include a condition that the roll rate has an absolute value less than a predetermined threshold. If this condition is not satisfied, mode transition involving engagement of the clutch 5 may be prohibited. With this configuration, when the vehicle body is being moved in the roll direction, the occurrence of torque variation due to engagement of the clutch 5 is prevented, and good operation feeling is ensured.

The clutch disengagement/engagement condition (shock accepting condition) may include at least one condition selected from a condition that the pitch angle of the vehicle body, as determined with respect to the upright position of the vehicle body, has an absolute value less than a predetermined threshold and a condition that the pitch rate has an absolute value less than a predetermined threshold. If the at least one condition is not satisfied, mode transition involving engagement of the clutch 5 may be prohibited. With this configuration, when the vehicle body is inclined or being moved in the pitch direction because of acceleration or deceleration, the occurrence of torque variation due to engagement of the clutch 5 is prevented, and good operation feeling is ensured.

The clutch disengagement/engagement condition (shock accepting condition) may include a condition that the pitch angle is less than a predetermined threshold in a rearward inclination direction and the total target torque (target motor torque+target engine torque) is a positive value. If this condition is not satisfied, mode transition involving engagement of the clutch 5 may be prohibited. With this configuration, during a wheelie induced by acceleration, the occurrence of torque variation due to engagement of the clutch 5 is prevented, and good operation feeling is ensured.

The clutch disengagement/engagement condition (shock accepting condition) may include a condition that the pitch angle is less than a predetermined threshold in a forward inclination direction and the total target torque (target motor torque+target engine torque) is a negative value. If this condition is not satisfied, mode transition involving engagement of the clutch 5 may be prohibited. With this configuration, during a nose dive induced by deceleration, the occurrence of torque variation due to engagement of the clutch 5 is prevented, and good operation feeling is ensured.

The clutch disengagement/engagement condition (shock accepting condition) may include a condition that the vehicle speed is equal to or higher than a predetermined threshold. If this condition is not satisfied, mode transition involving engagement of the clutch 5 may be prohibited. With this configuration, when the running inertia of the vehicle is insufficient, the occurrence of torque variation due to engagement of the clutch 5 is prevented, and good operation feeling is ensured.

The clutch disengagement/engagement condition (shock accepting condition) may include a condition that the slip ratio is less than a predetermined threshold. If this condition is not satisfied, mode transition involving engagement of the clutch 5 may be prohibited. With this configuration, during slip, the occurrence of torque variation due to engagement of the clutch 5 is prevented, and phenomena such as undesired progression of slip can be prevented.

The clutch disengagement/engagement condition (shock accepting condition) may include a condition that the engine rotational speed is equal to or higher than a predetermined threshold. If this condition is not satisfied, mode transition involving engagement of the clutch 5 may be prohibited. With this configuration, even when combustion in the engine 2 is unstable in a low rotational speed range due to a small crank weight, the operation of the engine 2 is prevented from being affected by engagement of the clutch 5, and good operation feeling is ensured.

The clutch disengagement/engagement condition (shock accepting condition) may include a condition that at least a predetermined time has elapsed from start-up of the engine 2 and the rotational speed of the electric motor 3 is less than a predetermined threshold. If this condition is not satisfied, mode transition involving engagement of the clutch 5 may be prohibited. With this configuration, it is possible to avoid a situation in which synchronization of the engine 2 and the electric motor 3 in a high rotational speed range is established before completion of warm-up operation of the engine 2 and imposes a burden on the engine 2.

In the case of NO in step S28 followed by YES in step S38, i.e., in the case where the transient mode is selected as the requested travel mode during travel in the HEV mode, it is determined whether the clutch disengagement/engagement condition (shock accepting condition) is satisfied (steps S39 and S40). That is, it is determined whether the clutch 5 may be disengaged for transition from the HEV mode to the transient mode. Steps S39 and S40 are the same as steps S34 and S35. That is, in the present embodiment, the same condition is used both as the clutch engagement condition for engaging the clutch 5 and as the clutch disengagement condition for disengaging the clutch 5. The clutch engagement condition and the clutch disengagement condition may be different.

If it is determined that the clutch disengagement/engagement condition (shock accepting condition) is satisfied (step S40: YES), the transient mode is set as the to-be-executed travel mode (step S41). The clutch control section 25 then sends a clutch operation signal to the clutch actuator 6, which causes the clutch 5 to be disengaged (step S42). The transient mode is stored as the current to-be-executed travel mode (step S23). If it is determined that the clutch disengagement/engagement condition (shock accepting condition) is not satisfied (step S40: NO), the transient mode is prohibited from being set as the to-be-executed mode, and the HEV mode remains as the to-be-executed travel mode.

As described above, during travel in the HEV mode in which the engine 2 is operated with the clutch 5 engaged, the transition to the transient mode in which the clutch 5 is disengaged is prohibited unless the clutch disengagement/engagement condition (shock accepting condition) is satisfied, even when the transient mode is requested. This prevents the clutch 5 from becoming disengaged while the engine 2 is in operation, thereby preventing abrupt torque variation. Consequently, the spontaneous occurrence of torque variation can be prevented in a travel state where any shock is undesired, and good operation feeling of the hybrid motorcycle 1 can be ensured.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A control apparatus of a hybrid leaning vehicle, the hybrid leaning vehicle including an engine configured as an internal combustion engine and an electric motor serving as a drive source for travel of the hybrid leaning vehicle, the control apparatus comprising:

memory that stores a program; and a processor configured to implement, according to the program:

a travel mode request section that requests one travel mode selected from a plurality of travel modes including a first travel mode in which the engine is stopped and the electric motor is operated and a second travel mode in which the engine is operated; and a travel mode setting section that determines whether a steady turning condition is satisfied and that, depending on a result of the determination, sets the travel mode requested by the travel mode request section as a travel mode to be executed, the steady turning condition including a condition that the leaning vehicle is determined to be in a predetermined steady turning state, wherein the steady turning state is a state in which a physical quantity affecting a vehicle body of the hybrid leaning vehicle is steady when a rider is making a turn by banking the vehicle body, when the travel mode request section requests the second travel mode during travel in the first travel mode, the travel mode setting section, upon determining that the steady turning condition is satisfied, sets the second travel mode as the travel mode to be executed, and when the travel mode request section requests the second travel mode during travel in the first travel mode, the travel mode setting section, upon determining that the steady turning condition is not satisfied, prohibits the second travel mode from being set as the travel mode to be executed.

2. The control apparatus according to claim 1, wherein the physical quantity includes an angular velocity of the vehicle body of the leaning vehicle about a front-rear axis of the vehicle body, and upon determining that the angular velocity has an absolute value less than a predetermined threshold, the travel mode setting section determines that the condition is satisfied.

3. The control apparatus according to claim 1, wherein the physical quantity includes a steering angular velocity of the leaning vehicle, and upon determining that the steering angular velocity has an absolute value less than a predetermined threshold, the travel mode setting section determines that the condition is satisfied.

4. The control apparatus according to claim 1, wherein the hybrid leaning vehicle is a parallel hybrid leaning vehicle including the engine as a drive source for travel of the parallel hybrid leaning vehicle and a clutch disposed in a power transmission route between the engine and a drive wheel, the second travel mode is a mode in which the engine is operated with the clutch disengaged, the plurality of travel modes further includes a third travel mode in which the engine is operated with the clutch engaged, the travel mode setting section determines whether a predetermined shock accepting condition is satisfied, when the travel mode request section requests the third travel mode during travel in the second travel mode, the travel mode setting section, upon determining that the shock accepting condition is satisfied, sets the third travel mode as the travel mode to be executed, and when the travel mode request section requests the third travel mode during travel in the second travel mode, the travel mode setting section, upon determining that the shock accepting condition is not satisfied, prohibits the third travel mode from being set as the travel mode to be executed.

5. The control apparatus according to claim 1, wherein the steady turning state is a state in which a change rate of the physical quantity has an absolute value less than a predetermined threshold.

6. The control apparatus according to claim 1, wherein the steady turning state includes a state in which a change rate of turning radius of the vehicle is less than a predetermined threshold, and upon determining that the change rate of turning radius is less than the predetermined threshold, the travel mode setting section determines that the condition is satisfied.

7. The control apparatus according to claim 1, wherein the steady turning state includes a state in which a change rate of lateral tire force of the vehicle is less than a predetermined threshold, and upon determining that the change rate of lateral tire force is less than the predetermined threshold, the travel mode setting section determines that the condition is satisfied.

8. A control apparatus of a hybrid leaning vehicle, the hybrid leaning vehicle including an engine configured as an internal combustion engine and an electric motor serving as a drive source for travel of the hybrid leaning vehicle, the control apparatus comprising:

a memory that stores a program; and a processor configured to implement, according to the program:

a travel mode request section that requests one travel mode selected from a plurality of travel modes including a first travel mode in which the engine is stopped and the electric motor is operated and a second travel mode in which the engine is operated; and a travel mode setting section that determines whether a condition is satisfied and that, depending on a result of the determination, sets the travel mode requested by the travel mode request section as a travel mode to be executed, wherein the condition is a condition that an angular velocity of a vehicle body of the leaning vehicle about a front-rear axis of the vehicle body has an absolute value less than a predetermined threshold when a rider is making a turn by banking the vehicle body, or a steering angular velocity of the leaning vehicle has an absolute value less than a predetermined threshold when a rider is making a turn by banking the vehicle body, when the travel mode request section requests the second travel mode during travel in the first travel mode, the travel mode setting section, upon determining that the condition is satisfied, sets the second travel mode as the travel mode to be executed, and when the travel mode request section requests the second travel mode during travel in the first travel mode, the travel mode setting section, upon determining that the condition is not satisfied, prohibits the second travel mode from being set as the travel mode to be executed.

9. A control apparatus of a hybrid leaning vehicle, the hybrid leaning vehicle including an engine configured as an internal combustion engine and an electric motor serving as a drive source for travel of the hybrid leaning vehicle, the control apparatus comprising:

a memory that stores a program including instructions of controlling the engine; and a processor configured to prohibit, according to the program, the engine from starting up in a state in which a power transmission route between the engine and a drive wheel is disengaged upon determining that the vehicle is turning in a state in which the engine is stopped and the electric motor is operated.

10. The control apparatus according to claim 9, wherein the state includes a change rate of a turning radius of the vehicle being greater than or equal to a predetermined threshold.

11. The control apparatus according to claim 9, wherein the state excludes a predetermined steady turning state.

\* \* \* \* \*